US005484076A

United States Patent [19]
Petrushka

[11] Patent Number: 5,484,076
[45] Date of Patent: Jan. 16, 1996

[54] LOAD BEARING MOUNTING BRACKET FOR HANGING A LIGHT FIXTURE FROM A MOUNTING RAIL OF A GRID CEILING SYSTEM

[76] Inventor: Stephen E. Petrushka, 3366 Mount Diablo Blvd., #402, Lafayette, Calif. 94549

[21] Appl. No.: 154,173

[22] Filed: Nov. 18, 1993

[51] Int. Cl.⁶ ................................................ H02G 3/08
[52] U.S. Cl. ............................ 220/3.9; 248/906; 248/343
[58] Field of Search ...................... 220/3.3, 3.9; 272/3.9; 248/906, 343

[56] References Cited

U.S. PATENT DOCUMENTS

| | | | |
|---|---|---|---|
| 2,380,793 | 7/1945 | Rugg | 220/3.9 |
| 2,758,810 | 8/1956 | Good | 220/3.9 |
| 3,080,084 | 3/1963 | Appleton | 220/3.9 |
| 3,214,126 | 10/1965 | Roos | 220/3.9 |
| 3,536,281 | 10/1970 | Meehan et al. | 220/3.9 |
| 4,050,603 | 9/1977 | Harris et al. | 220/3.9 |
| 4,682,452 | 7/1987 | Propp et al. | 220/3.9 |
| 4,909,405 | 3/1990 | Kerr, Jr. | 220/3.9 |
| 5,024,412 | 6/1991 | Hung et al. | 220/3.9 |
| 5,234,119 | 8/1993 | Jorgensen et al. | 220/3.9 |
| 5,407,088 | 4/1995 | Jorgensen et al. | 220/3.9 |

Primary Examiner—Joseph M. Moy
Attorney, Agent, or Firm—Donald L. Beeson

[57] ABSTRACT

A saddle shaped mounting bracket straddles a conventional junction box mounting rail of a grid ceiling system and is used as a support location for hanging a lighting fixture from the grid ceiling. The mounting bracket has a straddle slot extending through the bottom portion of the bracket to allow the bracket to straddle the mounting rail. Threaded studs on the bottom of the bracket provide a means for coupling an electrical junction box to the bracket when the mounting bracket is used at an electrical feed location, or for coupling to other connector bracket hardware when the mounting bracket is used at a non-feed location. Load wires anchored to the overhead ceiling structure are attached to wire holes in the sides of the mounting bracket to provide efficient anchoring of the bracket.

17 Claims, 5 Drawing Sheets

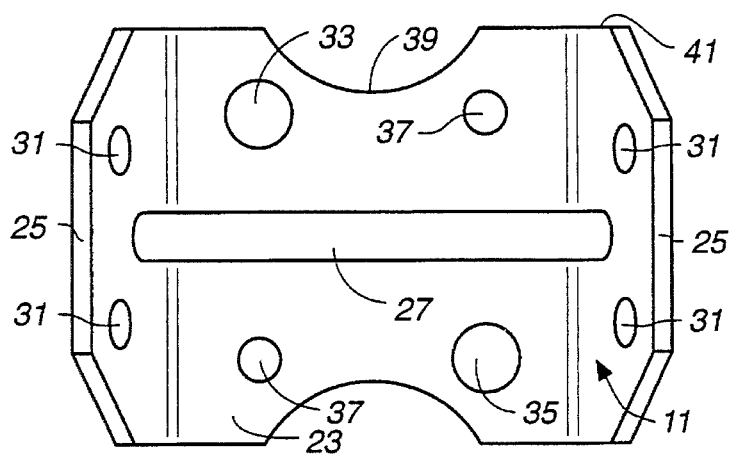
FIG._1
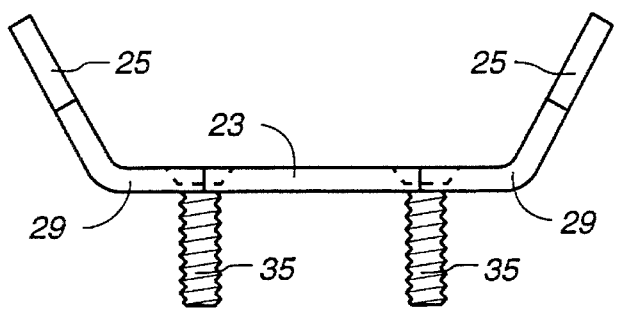
FIG._2
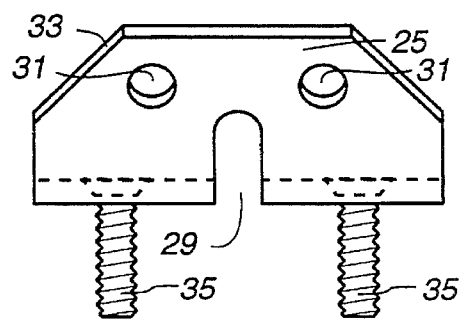
FIG._3
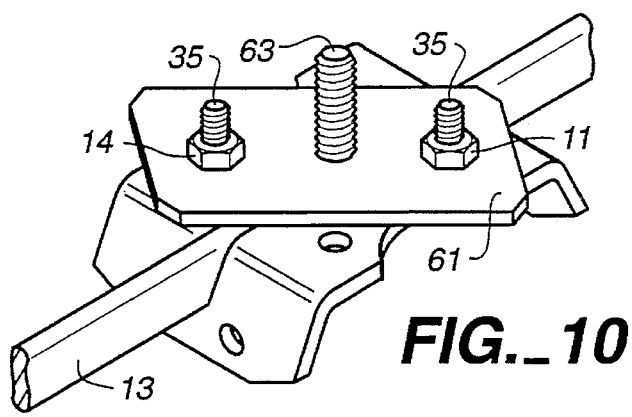
FIG._10

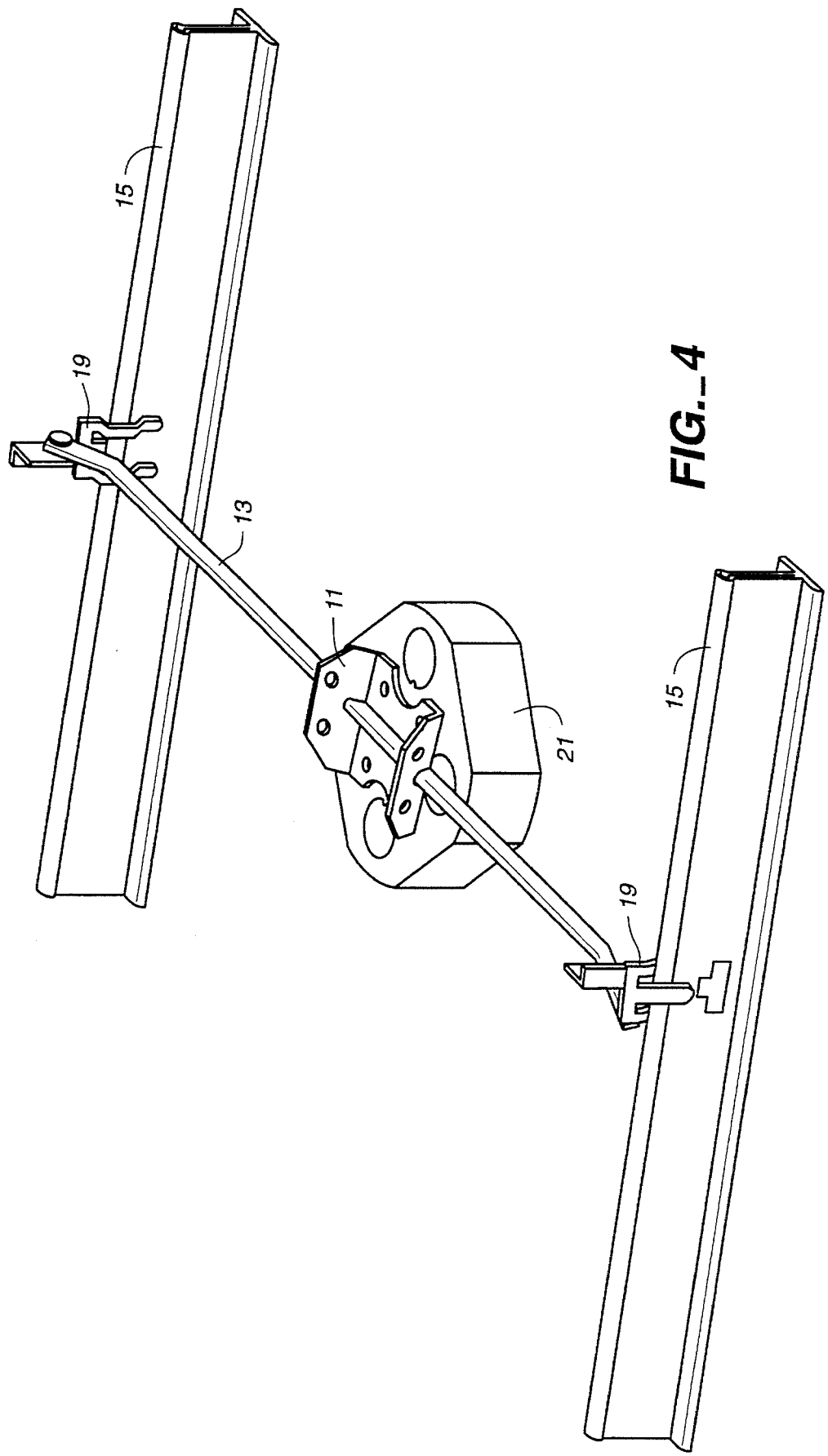

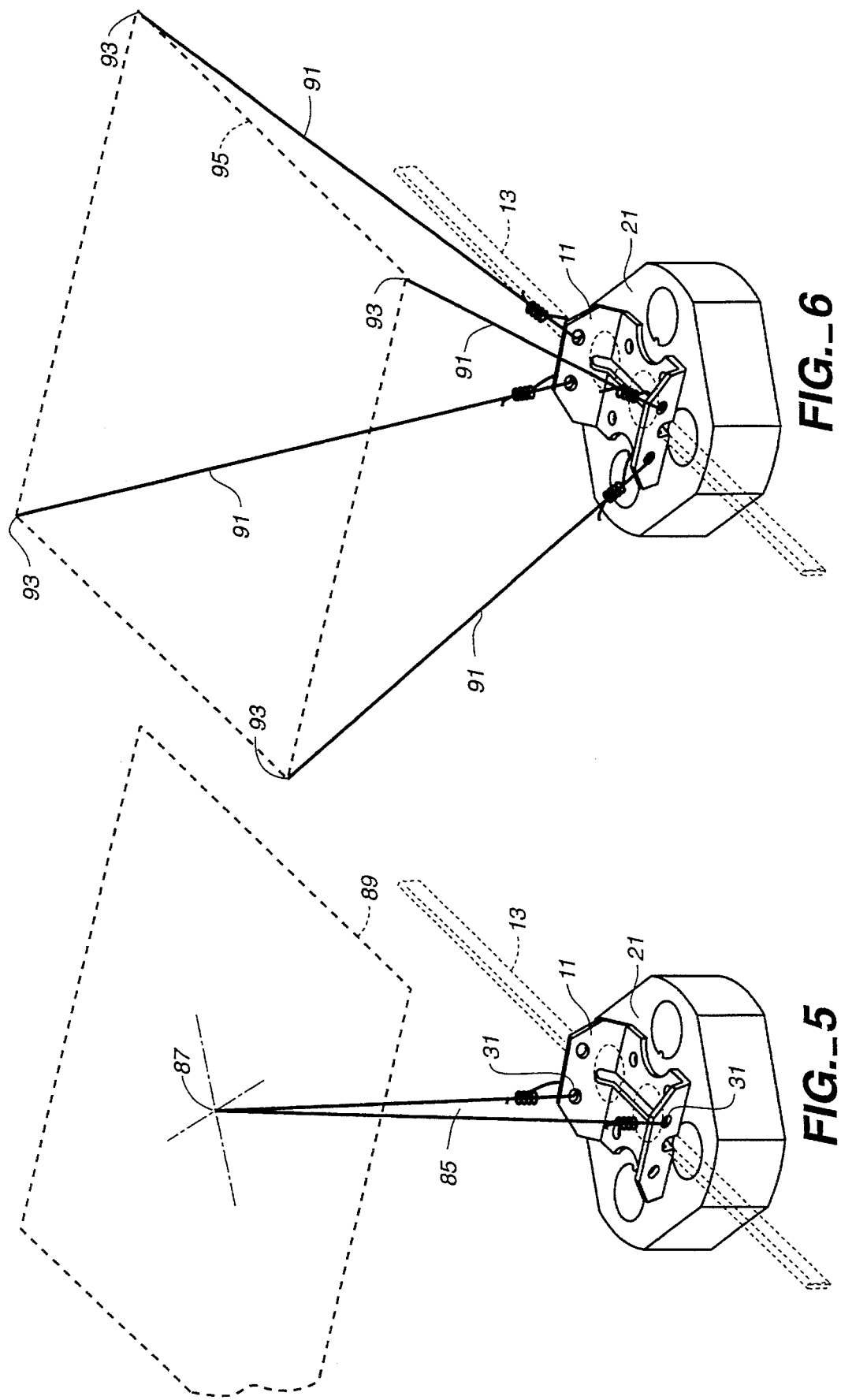

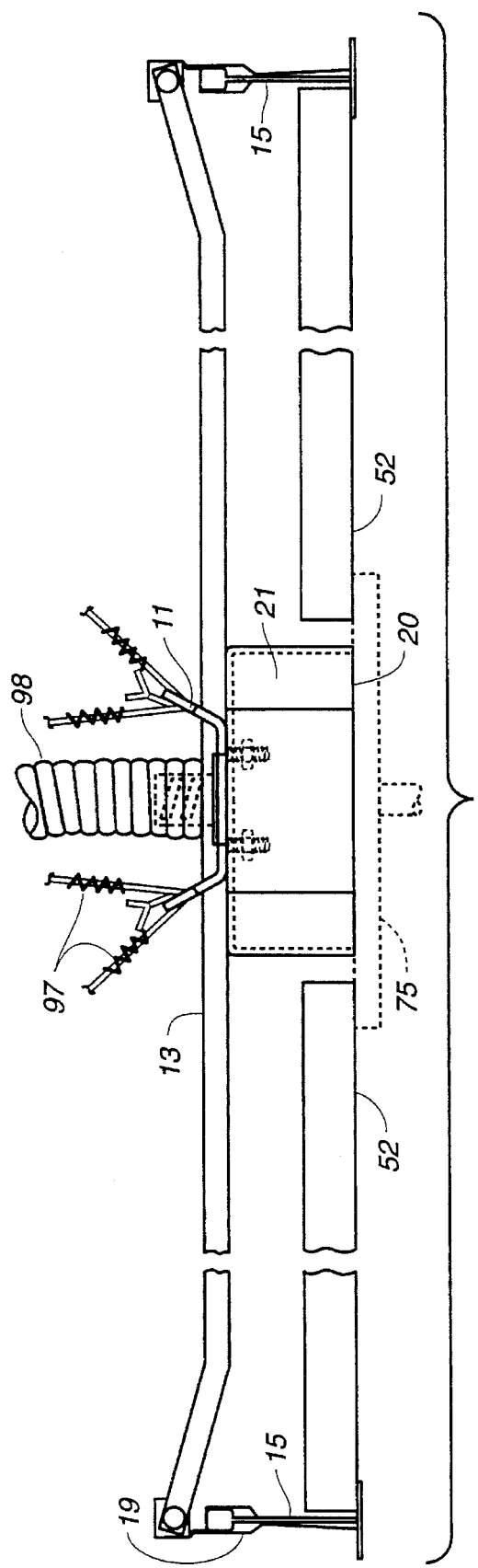
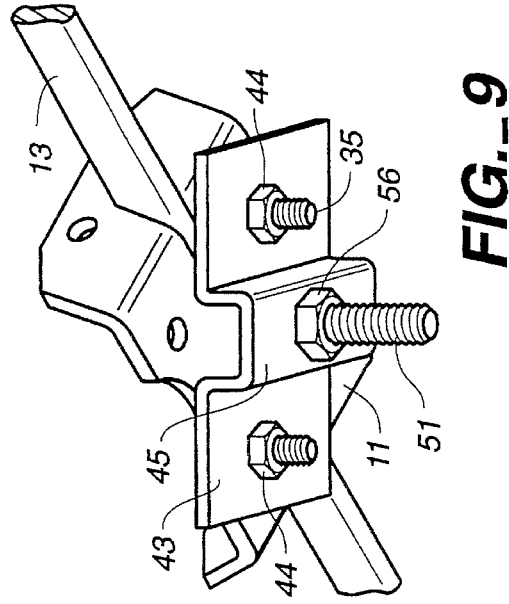
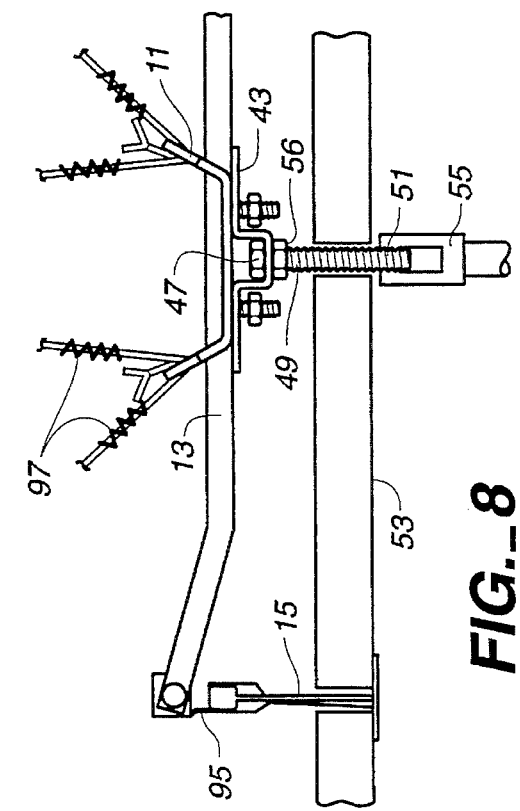

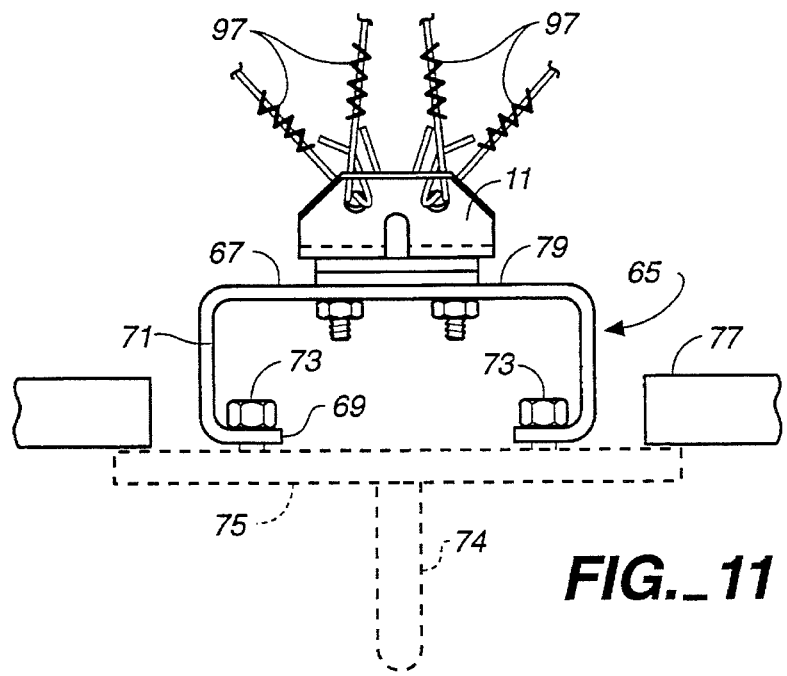
FIG._11
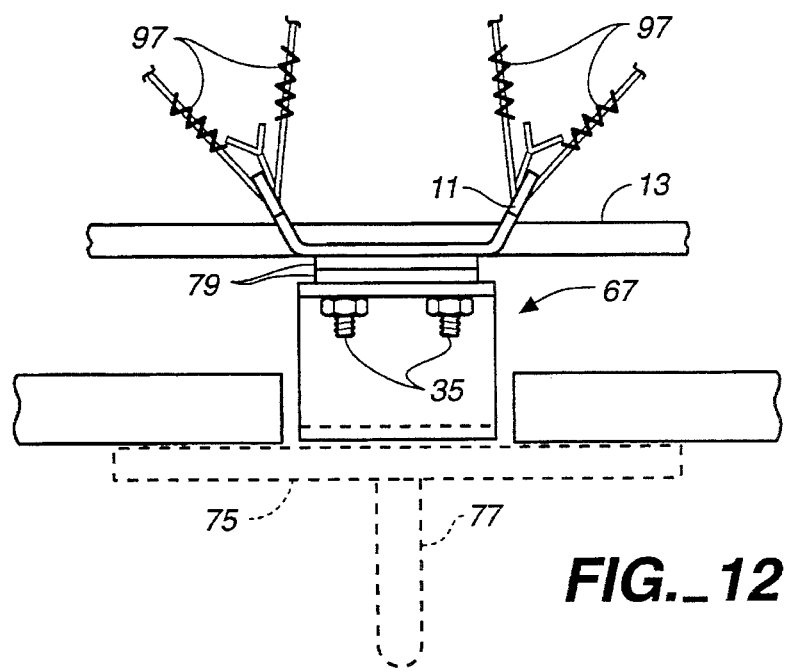
FIG._12
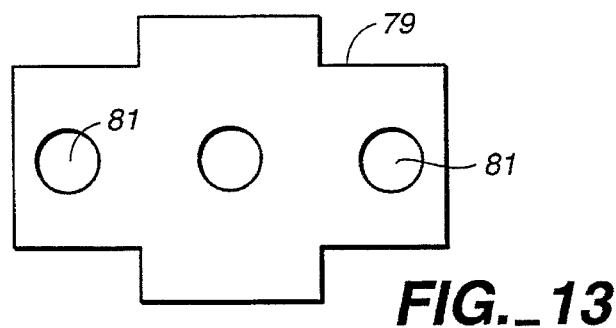
FIG._13

LOAD BEARING MOUNTING BRACKET FOR HANGING A LIGHT FIXTURE FROM A MOUNTING RAIL OF A GRID CEILING SYSTEM

BACKGROUND OF THE INVENTION

The present invention generally relates to the installation of architectural lighting fixtures, and more particularly to the mounting or suspension of lighting fixtures from a grid ceiling system.

Heretofore, lighting fixtures have been supported below grid ceilings using cumbersome support structures that are relatively difficult and costly to install. Prior methods of support involve, for example, the use of separate support members such as angle irons or unistruts which are cut to a required length at the job site. These support members are positioned on top of or above the grid ceiling at specified fixture support locations, and then they are anchored to the building superstructure by overhead load wires. (In earthquake prone areas the load wires must, in addition to supporting a vertical load, provide lateral support.) Wherever an electrical feed is required, an electrical junction box must be installed along with the anchored support member. For this purpose commercially available mounting rails that fasten to the T-bars of the grid ceiling system are commonly used.

Mounting rails are installed across the individual grids of the ceiling's T-bar grid structure and permit the junction box to easily be located within selected grids. Sometimes a load wire is dropped directly to the mounting rail and attached by means of a wire clip, however, without independent support the load carrying capacity of such an arrangement is limited.

A need therefor exists for a comparatively simple and efficient means for supporting lighting fixtures beneath a grid ceiling system. The present invention fulfills this need by providing a load bearing mounting bracket and bracket assembly that are installed using commercially available mounting rails, that eliminate the need for separate support structures, that can satisfy most load specifications, and that offer a savings in labor and materials as compared to support systems heretofore used. The invention particularly provides the potential for substantial cost savings on large building projects involving a large number of installed lighting fixtures and fixture attachment points. The mounting bracket and bracket assembly of the invention are readily adapted for use at both electrical feed and non-feed locations, and can be used to accommodate different structural environments and load wire configurations.

SUMMARY OF THE INVENTION

Briefly, the invention involves a saddle-shaped mounting bracket having a straddle slot which is sized to receive an accessory mounting rail used on a grid ceiling system. More specifically, the mounting bracket has a bottom plate portion and opposed side plate portions extending upwardly from the bottom plate portion. The straddle slot extends through the bottom plate portion and up into the side plate portion a sufficient distance to accommodate the depth of the straddle slot. Each of the side plate portions additionally have load wire attachment means by which overhead load wires can be attached to the mounting bracket. Preferably the side plate portions of the bracket are angled relative to the bottom plate to facilitate the attachment of splayed load wires for providing lateral, as well as vertical support. It is understood, however, that the side plate portions could instead be perpendicular to the bottom plate portion.

The fastening means for the load wires on the side plate portions are preferably in the form of wire holes. Preferably four wire holes are provided, with one wire hole being located at each corner of the side plate portions to provide one wire hole on either side of the straddle slot. As further described below, various splayed load wire configurations can be achieved from such a wire hole arrangement for meeting different mounting requirements.

While wire holes are the preferred and illustrated form of load wire attachment means, it shall be appreciated that other load wire attachment means could be provided on the side plate portions, for example, the side plate portions might be provided with wire attachment posts having eyelets for securing the load wires.

Coupling means are further associated with the bottom plate portion of the mounting bracket such that the anchored mounting bracket can be used to support a lighting fixture below the grid ceiling system. In the preferred embodiment, the coupling means are in the form of threaded studs which extend from the underside of the bottom plate portion and which are spaced to register with a pre-existing hole pattern of an electric junction box. Thus, the threaded studs can be used to secure an electrical junction box at an electrical feed location, or to secure other interconnecting hardware as hereinafter described at a non-feed location.

The load bearing bracket assembly of the invention contemplates the use of such interconnecting hardware. Specifically, the interconnecting hardware of the load bearing mounting bracket assembly are in the form of connector bracket means attached to the bottom portion of the mounting bracket for interconnecting the mounting bracket to the support hardware of a lighting fixture mounted to or suspended below the grid ceiling. Additional spacers insertable between the mounting bracket and the connector bracket means can be provided for adjusting the vertical position of the lighting fixture support hardware relative to the grid ceiling so as to properly locate the fittings and/or cover plates of the support hardware relative to the ceiling tiles. Connector bracket means of various designs can be provided, including a straight strap having a threaded attachment element extending from the strap to receive the female fitting associated with the fixture's support hardware, or a strap having a recessed center for holding the head of a separate attachment bolt between the strap and the bottom plate portion of the mounting bracket. The connector bracket might also include an inverted U-shaped bracket designed to have a mounting strap attached to its ends such that the mounting strap is spaced substantially below the mounting bracket straddling the grid ceiling mounting rail. Such a connector bracket can be used in conjunction with or instead of an electrical junction box to secure additional support hardware such as the mounting strap of a cover plate.

It is therefore a primary object of the invention to provide a mounting bracket and mounting bracket assembly that provides a cost effective means for installing a lighting fixture below a grid ceiling system. It is a further object of the invention to provide a mounting bracket and mounting bracket assembly involving few parts from a single manufacturing source, that can be installed relatively easily, and that can be used to meet a wide variety of load specifications and structural conditions. Other objects of the invention will be apparent from the following specification and claims.

DESCRIPTION OF THE DRAWINGS

FIG. 1 is a top plan view of a load bearing mounting bracket in accordance with the present invention.

FIG. 2 is a front elevational view thereof.

FIG. 3 is a side elevational view thereof.

FIG. 4 is a top perspective view of a load bearing mounting bracket in accordance with the invention installed at an electrical feed location on the mounting rail of a grid ceiling system and showing an electrical junction box attached thereto.

FIG. 5 is a top perspective view of the mounting bracket and electrical junction box shown in FIG. 4 showing one configuration for attaching overhead load wires to the mounting bracket of the invention.

FIG. 6 is a top perspective view of the mounting bracket and electrical junction box of FIG. 4 showing another configuration for attaching overhead load wires to the mounting bracket, and particularly showing splayed load wires.

FIG. 7 is a side elevational view of the installed mounting bracket and electrical junction box shown in FIG. 4 showing yet another overhead load wire attachment configuration and showing the installation relative to the ceiling tiles of a grid ceiling system.

FIG. 8 is a fragmentary side elevational view of a load bearing mounting bracket assembly in accordance with the invention having a connector bracket means for installation of a lighting fixture at a non-feed location.

FIG. 9 is a fragmentary bottom perspective view of the load bearing mounting bracket assembly shown in FIG. 8.

FIG. 10 is a fragmentary bottom perspective view of a load bearing mounting bracket assembly in accordance with the invention showing an alternative embodiment of the connector bracket means.

FIG. 11 is a side elevational view of a load bearing mounting bracket in accordance with the invention showing yet another alternative embodiment of the connector bracket means.

FIG. 12 is an end elevational view of the mounting bracket shown in FIG. 11.

FIG. 13 is a top plan view of a spacer element which, as shown in FIGS. 9 and 10, act to adjust the vertical positioning of the connector bracket means relative to the ceiling tiles of the grid ceiling system.

DETAILED DESCRIPTION OF THE ILLUSTRATED EMBODIMENT

The invention is used with a grid ceiling system suspended below a structural ceiling. A grid ceiling typically has a T-bar grid which hangs from the room's structural ceiling by drop wires and which supports ceiling tiles, typically acoustical tiles, at a desired height from the floor. The invention particularly makes use of pre-existing mounting rails conventionally used to install electrical junction boxes in the grid ceiling.

Referring now to the drawings, FIG. 4 shows mounting bracket 11 installed on the mounting rail 13 spanning opposed T-bar elements 15 of a grid ceiling system. The mounting rail is attached to the grid's T-bars by means of clips 19, which, together with the mounting rail, is a standard, commercially available accessory product supplied by Caddy Fasteners Company, a division of Erico, Inc. As seen in FIG. 4, the mounting bracket 11 holds an electrical junction box 21 to provide an electrical feed location in the grid ceiling; it can also provide a non-feed location by using other connector brackets as hereinafter described. Whether a feed or non-feed location, two degrees of adjustment are provided for positioning the bracket 11 within the ceiling grid: one degree of adjustment is provided by sliding the mounting rail 13 along the grid ceiling T-bar elements 15; and another degree of adjustment is provided by sliding the mounting bracket 11 along the mounting rail itself.

The particulars of the construction of the mounting bracket are best illustrated with reference to FIGS. 1–3. The mounting bracket is seen to include a bottom plate portion 23 and opposed side plate portions 25 which extend upwardly and at an angle from the bottom plate portion. Straddle slot 27, which extends through the bottom plate portion and up into the side plate portions, is sized to receive the mounting rail 13 as shown in FIG. 4. Thus, the straddle slot has a width slightly greater than the mounting rail and the ends 29 of the straddle slot will extend up into the side plate portions 25 a distance substantially corresponding to the depth of the mounting rail. When the straddle slot straddles the mounting rail as shown in FIG. 4, preferably a very small portion of the mounting rail will extend below the bottom plate portion of the mounting bracket to permit the rail to be firmly gripped when a junction box or connector hardware are secured to the bottom of the bracket.

The mounting bracket's side plate portions 25 have load wire attachment means in the form of wire holes 31 which are situated near the top of the side plate portions to receive load wires anchored to overhead structural elements of the building. Specifically, a corner wire hole is located proximate each of the angled top corner 33 of each of the side plate portions such that, for each side plate, one wire hole is disposed on either side of the straddle slot 27. (The angled top corners of the side plate portions will facilitate tying of the load wires.) Other wire hole arrangements are possible, such as providing an additional centered wire hole on each side plate over the straddle slot for a total of three instead of two wire holes on each side of the bracket. However, the illustrated and described four corner arrangement of wire holes is contemplated to be the most cost effective distribution of wire holes.

The bottom plate portion 23 of the mounting bracket has associated with it a coupling means by which the mounting bracket can be used to support a lighting fixture to be installed on the grid ceiling system. Referring to FIGS. 2 and 3, it can be seen that this coupling means includes two threaded studs 35 extending downwardly from bottom plate portion 25 of the bracket. The threaded studs, which suitably can be press-fit bolts pressed from the top into the bracket's bottom plate portion, are located on opposite sides of the straddle slot 27 and are provided with a spacing that corresponds to the spacing of the pre-existing hole pattern in a standard electrical junction box. In this way the mounting bracket can secure an electrical junction box at an electrical feed location, or can be used to secure other connecting hardware at a non-feed location as hereinafter described.

The bottom plate portion of the mounting bracket can additionally be provided with other suitable attachment holes, such as holes 37. Recesses 39 in edges 41 of the bracket are provided to accommodate wire connectors used in wiring the junction box.

FIGS. 8–12 show connector bracket means for interconnecting the support hardware of a lighting fixture to mounting bracket 11 at a non-feed location where a junction box is not used. In FIGS. 8–9 the connector bracket means is in the form of a mounting strap 43 positioned across the straddle slot 27 and secured to the mounting bracket studs 35 by nuts 44. The strap has a center recess portion 45 for holding the head 47 of removable attachment bolt 49 between the strap and the bottom plate portion 23 of the mounting bracket. The threaded end 51 of bolt 49, which is secured to the strap by nut 56, has sufficient length to extend through the ceiling tile 53 for receiving the fitting 55 associated with the lighting fixture support hardware.

FIG. 10 shows an alternative embodiment of the mounting strap shown in FIGS. 8 and 9. In FIG. 10 a flat mounting strap 61 has an integral threaded element 63 which like studs 35, can be threaded elements press fit into the strap. The flat strap 61 is installed on the mounting bracket 11 in the same manner as strap 43 shown in FIGS. 8 and 9, that is, by securing the strap over studs 35 by nuts 44.

FIGS. 11 and 12 illustrate yet another connector bracket means comprised of an inverted U-shaped bracket 65 having a base portion 67 that attaches to the bottom plate portion 23 of mounting bracket 11. The ends 69 of downwardly extending arms 71 of the bracket have cage nuts 73 for receiving screws of a mounting strap such as may be used for mounting canopy 75 and stem 74 to the ceiling as shown in FIGS. 11 and 12. It is seen that the extended arms 71 of the inverted U-shaped bracket act to space the attachment points for the canopy below the mounting bracket as required to position the canopy at the bottom surface of the ceiling tiles 77. This spacing, that is the length of the arms of the inverted U-shaped bracket, can be made to correspond to the depth of a standard electrical junction box such that bracket 65 and a junction box can be interchanged depending on whether the support point is at a feed or non-feed location.

FIG. 13 shows a spacer element 79 which can be inserted between the mounting bracket 11 and any of the connector bracket means illustrated in FIGS. 8–12 for adjusting the vertical position of the lighting fixture suspension hardware relative to the grid ceiling, such as vertically positioning the canopy shown in FIGS. 11 and 12. It is contemplated that spacer elements of varying thicknesses and having suitable stud holes 81 can be supplied by the manufacturer to accommodate a variety of installation requirements.

Use of the mounting bracket and mounting bracket assembly of the invention is first described in reference to FIGS. 5 and 6 which show examples of possible load wire configurations using the mounting bracket of the invention. It shall be understood that the load wire configurations illustrated in FIGS. 5 and 6 are illustrative only. The actual load wire scheme used for a particular installation will be determined by local various requirements such as building codes, the structural configuration of the installation, and the presence or absence of obstructions, such as heating ducts in the vicinity of the support location.

FIG. 5 illustrates an installation involving two load wires 85 anchored to a single point at 87 on an overhead ceiling generally illustrated by the phantom lines 89. These two load wires are attached to diametrically opposed wire holes 31 of the mounting bracket (which, as illustrated, supports junction box 21) so as to anchor the bracket from opposite sides of the mounting rail 13. In FIG. 6, four splayed load wires 91 are instead used, one attached to each of the mounting holes of the mounting bracket. The splayed load wires are seen to be connected at four distributed points 93 on the overhead ceiling structure depicted by phantom lines 95. The load wire configuration illustrated in FIG. 6 will involve more labor to install as compared to the configuration illustrated in FIG. 5, but the FIG. 6 configuration will provide greater lateral support which may be required by code. For still greater support, two or more load wires can be attached to each wire hole as illustrated in respect to load wires 97 in FIGS. 7, 8, 11 and 12.

Installation of the mounting bracket for an electrical feed location is described in reference to FIGS. 4 and 7. The first step in attaching a lighting fixture at the feed location is to locate the mounting rail 13 within the grid ceiling system near the feed location in a manner well-known in the art. The mounting bracket 11 is then placed over the mounting rail such that the mounting rail is engaged in the straddle slot of the mounting bracket. Before junction box 21 is securely fastened to the bottom of the mounting bracket, the mounting bracket and junction box can be moved in either direction along the mounting rail to locate, along with further adjustments of the mounting rail on the T-bar elements 15, the junction box in the desired position. Referring to FIG. 7, it is seen that the bottom 20 of the junction box is flush with the ceiling tiles 52 to receive canopy 75. To the extent necessary, vertical adjustments of the junction box can be accomplished by inserting one or a suitable combination of spacer elements 79 between the junction box and mounting bracket.

Once the junction box is located, load wires are installed and attached to the mounting bracket in whatever configuration is required. The junction box is then wired in a conventional manner, e.g., using BX cable 98, and the lighting fixture installed.

In the case of a non-feed location, a suitable connector bracket means is selected depending on the installer's requirements and is attached to the bottom of the mounting bracket after the mounting bracket is installed on the mounting rail. Before the connector bracket means is tightened onto the mounting bracket, the assembly is suitably located in the same manner as the electrical junction box was located as described above. Once the assembly is properly located and the load wires are attached, the connector bracket can be tightened, and the lighting fixture secured to the connector bracket. In the case of the mounting strap shown in FIGS. 8–10, this is a matter of attaching one of the mounting straps 43, 61 to the studs 35 of the mounting bracket's bottom plate portion 23, and then after the ceiling tile is in place, screwing the female fitting of the lighting fixture support hardware, such fitting 55 in FIG. 8 as, to the threaded end of the threaded element of the strap. In the case of the inverted U-shaped bracket of FIGS. 11 and 12, this is a matter of bolting the base of bracket 65 to the bottom of the mounting bracket 11 and then screwing a separate mounting strap for the canopy 75 onto the bottom ends of the bracket using cage nuts 73. Again, vertical positioning of the mounting location can be adjusted, as in the case of any of the connector bracket means, by using one or a suitable combination of spacers as shown in FIG. 13.

Therefore, it can be seen that the present invention provides a versatile load-bearing mounting bracket and mounting bracket assembly that can be used to efficiently support a lighting fixture at either a feed or non-feed location, and that can be installed relatively easily with few total assembly parts provided by the manufacturer. It is the intent of the invention to reduce the labor and materials required for supporting lighting fixtures below a grid ceiling in commercial installations and to provide a mounting bracket and bracket assembly that can accommodate a wide variety a installation requirements. While the invention is described in the foregoing specification in considerable detail, it will be understood that it is not intended that the invention be limited to such detail, except as necessitated by the following claims.

What I claim is:

1. A load bearing mounting bracket for hanging a lighting fixture from a mounting rail of a grid ceiling system, said mounting bracket comprising a bottom plate portion, opposed side plate portions extending upwardly of said bottom plate portion, a straddle slot extending through said bottom plate portion and up into said side plate portions for receiving a mounting rail of the grid ceiling system such that the mounting rail is straddled by said mounting bracket, load wire attachment means on each of said side plate portions for anchoring the mounting bracket to a load bearing structure, and coupling means associated with said bottom plate portion by which the load bearing mounting bracket can support a lighting fixture to be installed on the grid ceiling system.

2. The mounting bracket of claim 1 wherein said side plate portions extend upwardly and outwardly at an angle relative to said bottom plate to facilitate attachment of splayed load wires to the load wire attachment means thereon.

3. The mounting bracket of claim 1 wherein said load wire attachment means on each of said side plate portions include wire holes in said side plate portions.

4. The mounting bracket of claim 3 wherein at least one wire hole is provided on each side of the straddle slot on each of said side plates.

5. The mounting bracket of claim 1 wherein the coupling means associated with said bottom plate portion includes a junction box attachment means for securing an electrical junction box to the underside of said bottom plate portion.

6. The mounting bracket of claim 1 wherein the coupling means associated with said bottom plate portion includes at least two threaded studs spaced to register with a pre-existing hole pattern of an electrical junction box projecting from the underside of said bottom plate portion.

7. A load bearing mounting bracket for hanging a lighting fixture from a mounting rail of a grid ceiling system, said mounting bracket comprising a bottom plate portion, opposed side plate portions extending upwardly of, and outwardly at an angle relative to said bottom plate portion, a straddle slot extending through said bottom plate portion and up into said side plate portions for receiving a mounting rail of the grid ceiling system such that the mounting rail is straddled by said mounting bracket, at least one overhead load wire attachment hole on each side of said straddle slot on each of said side plate portions for attaching splayed load wires anchored to an overhead load bearing structure, and at least two threaded studs projecting from the underside of said bottom plate portion, said studs being spaced to register with a pre-existing hole pattern of an electrical junction box.

8. A load bearing mounting bracket for hanging a lighting fixture from a mounting rail of a grid ceiling system, said mounting bracket comprising a saddle shaped body having a bottom portion, angled side portions, a straddle slot extending through said bottom portion and up into said side portions for receiving a mounting rail of the grid ceiling system such that the mounting rail is straddled by said mounting bracket, and overhead load wire attachment means on each of said side portions for anchoring the mounting bracket to an overhead load bearing structure.

9. The mounting bracket of claim 8 wherein said load wire attachment means includes wire holes in said side portion on each side of said straddle slot.

10. The mounting bracket of claim 9 further including at least two threaded studs projecting from the underside of said bottom plate portion, said studs being spaced to register with a pre-existing hole pattern of an electrical junction box.

11. A load bearing mounting bracket assembly for hanging a lighting fixture from a mounting rail of a grid ceiling system, said mounting bracket assembly comprising a mounting bracket including a bottom plate portion, opposed side plate portions extending upwardly of said bottom plate portion, a straddle slot extending through said bottom plate portion and up into said side plate portions for receiving a mounting rail of the grid ceiling system such that the mounting rail is straddled by said mounting bracket, said side plate portions including overhead load wire attachment means thereon for anchoring the mounting bracket to an overhead load bearing structure, and connector bracket means attachable to the bottom plate portion of said mounting bracket for interconnecting said mounting bracket to the support hardware of a lighting fixture supported under the grid ceiling.

12. The mounting bracket assembly of claim 11 further including at least one spacer element insertable between said mounting bracket and said connector bracket means for adjusting the vertical positioning of the lighting fixture support hardware relative to the grid ceiling.

13. The mounting bracket assembly of claim 11 wherein said connector bracket means is comprised of a strap having a center recess portion for holding the head of a removable attachment bolt between said strap and the bottom plate portion of said mounting bracket, said bolt having a threaded end for receiving a threaded female fitting associated the support hardware of a lighting system.

14. The mounting bracket assembly of claim 11 wherein said connector bracket means is comprised of a straight strap having an attachment element extending therefrom, said attachment element having a threaded end for receiving a threaded female fitting associated the support hardware of a lighting system.

15. The mounting bracket assembly of claim 11 wherein said connector bracket means is comprised of an inverted U-shaped bracket having a base portion attachable to the bottom plate portion of said mounting bracket, and downwardly extending arms, the ends of said downwardly extending arms having strap attachment means for attaching a mounting strap across the ends thereof whereby the mounting strap is spaced from said mounting bracket by the arms of said connector bracket means.

16. A load bearing mounting bracket assembly for hanging a lighting fixture from a mounting rail of a grid ceiling system, said mounting bracket assembly comprising a mounting bracket including a bottom plate portion, two threaded studs projecting from the underside of said bottom plate portion, said studs being spaced to register with a pre-existing hole pattern of an electrical junction box, opposed side plate portions extending upwardly of said bottom plate portion, a straddle slot extending through said bottom plate portion and up into said side plate portions for receiving a mounting rail of the grid ceiling system such that the mounting rail is straddled by said mounting bracket, said side plate portions including load wire attachment means thereon for anchoring the mounting bracket to an load bearing structure, and connector bracket means for interconnecting said mounting bracket to the support hardware of a lighting fixture supported under the grid ceiling, said connector bracket means having stud holes for receiving the threaded studs projecting from the underside of said bottom plate portion of said mounting bracket.

17. The mounting bracket assembly of claim 16 further including at least one spacer element insertable between said mounting bracket and said connector bracket means for adjusting the vertical positioning of the lighting fixture support hardware relative to the grid ceiling, said spacer elements having stud holes for receiving the threaded studs on the bottom plate portion of said mounting bracket.

* * * * *